Dec. 16, 1952　　　　　　　　H. ALLEN　　　　　　　　2,621,888
ROTARY PLUG VALVE SEAT
Filed Oct. 4, 1948
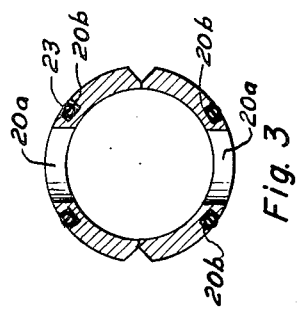
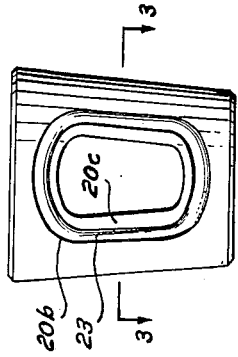
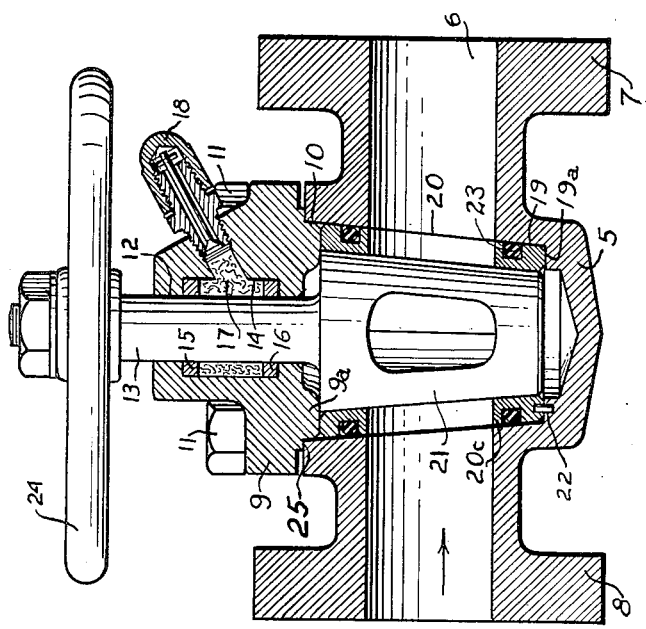
Herbert Allen
INVENTOR.
BY *Browning & Simms*
ATTORNEYS Patented Dec. 16, 1952

2,621,888

UNITED STATES PATENT OFFICE 2,621,888

ROTARY PLUG VALVE SEAT

Herbert Allen, Houston, Tex., assignor to Cameron Iron Works, Inc., Houston, Tex., a corporation of Texas Application October 4, 1948, Serial No. 52,625

3 Claims. (Cl. 251—113)

This invention refers to improvements in valves and has for its general object the provision of a plug-type valve which is especially efficient in controlling fluid under high pressures.

In plug valves heretofore used it has been difficult to provide a positive seal between the liner seat and the valve body, and the liner seat and the valve members, because of distortions of the materials of these parts under the influence of high pressure differentials. These distortions result in leaks in the valve. In order to overcome this it has been suggested to use a plastic packing between the seat liner and the valve body and to substantially float the liner within the body. Plastic packing can be forced in under pressure and seals any spaces between the liner seat and the body which might result in a leak. While these valves have been substantially satisfactory from the standpoint of holding the pressure, they are expensive to fabricate and require some attention from time to time for the purpose of refilling the plastic packing reservoirs and the like.

An object of this invention is to provide a plug valve capable of positively controlling high pressures, and which may be economically manufactured.

Another object is to provide in a plug-type valve a positive seal between the seat liner and valve body wherein the sealing material is not expended in service.

A further object is to provide in a plug-type valve two positive seals of resilient material which is not expended in service wherein flow through the valve may be in either direction and in which only one of the seals is subjected to a pressure differential with a given direction of flow and the other seal will be effective to control the pressure in the event of failure of the first seal.

Still another object is to provide in a plug-type valve a liner seat having a positive seal between the liner and body and wherein a lip portion of the liner is exposed to the upstream pressure and is urged thereby against the plug valve member when in closed position to render the seal between the valve member and liner more effective.

A still further object is to provide in a plug-type valve a liner seat having a positive seal between the liner and body and wherein a lip portion of the liner is exposed to the upstream pressure and is urged thereby against the plug valve member when in closed position to render the seal between the valve member and liner more effective and wherein a solid metal-to-metal support for the plug valve member and liner is provided by the valve body on the downstream side of the plug valve member.

Other and further objects of this invention will appear from the description.

In the accompanying drawings which form a part of the instant specification, are to be read in conjunction therewith, and wherein like reference numerals are employed to designate like parts in the various views:

Fig. 1 is a cross-sectional view along a vertical plane including the axis of the valve passageway of a valve embodying this invention;

Fig. 2 is a side-elevational view of the seat liner shown in Fig. 1, looking in a direction at right angles to Fig. 1;

Fig. 3 is a view taken along the line 3—3 in Fig. 2 in the direction of the arrows.

Referring to the valve shown in Fig. 1, the valve body 5 is formed with a passageway 6 therethrough with flange fittings 7 and 8 at the ends of the passageway to facilitate connection of the valve body within a flow line. The valve body carries a bonnet 9 which covers the open end 10 of a valve chamber. The bonnet 9 is secured to the body by means of suitable bolts 11, and a suitable gasket (not shown) may be employed in the annular space 25 to provide a seal therebetween.

Bonnet 9 has a central passage 12 which receives the valve stem 13. In order to provide a seal about the stem, passage 12 is provided with a large-diameter intermediate chamber 14 which serves as a stuffing box. A suitable packing arrangement may include seal rings 15 and 16 within and adjacent the opposite extremities of the chamber 14, between which rings a body of plastic packing is forced. The plastic packing is supplied through port 17 in the wall of bonnet 9 by means of a plastic injector which may be of conventional form shown schematically at 18.

The body 5 has a valve chamber 19 which may have a tapered wall and which extends from the opening 10. This chamber 19 houses the seat liner 20 and plug valve member 21, the latter being carried on the lower end of stem 13. Liner 20 seats at its lower edge on a shoulder 19a at the bottom of chamber 19 and this shoulder and the bottom edge of the liner have registering key holes which receive a key pin 22. This key pin prevents rotation of the liner within the valve body. The bonnet 9 has an annular shoulder 9a which, when secured in place, abuts both the upper edge of liner 20 and the upper face of the plug valve member holding them against axial movement within the valve body.

The seat liner has been referred to as an individual element and may be fabricated from a single frusto-conical element. However, the seat liner preferably is made in two parts, as shown more clearly in Fig. 3, in the interest of ease of fabrication and assembly.

The seat liner has openings 20a in each half which are adapted to align with the passageway 6 through the valve body. The liner has a close tolerance tapered fit with the chamber 19 of the valve body and in order to provide a seal between the body and liner and surrounding the passageway, one of the abutting surfaces of the body and liner is grooved and a resilient seal member which may be of the O-ring type is secured therein. Preferably, the groove is in the liner as shown at 20b. The seal members 23 are lodged in each of the grooves 20b. These grooves are spaced somewhat outwardly of the openings 20a and thus provide a lip portion 20c which, on the upstream side of the plug valve member, is exposed to the upstream pressure and will be forced by this pressure into tight sealing engagement with the plug valve member 21.

On the downstream side of the plug valve member the O-ring 23 will be protected from the pressure differential across the closed valve by the seal on the upstream side. However, in the event of failure of the upstream seal, the seal on the downstream side of the plug valve will be effective to hold the pressure. Also, with this arrangement of the double seal the valve may be installed to control flow of fluid regardless of the direction of flow in the conduit.

It is believed that the operation of this valve is apparent from the foregoing description. The valve is assembled as shown in Fig. 1 and the plug valve member 21 is mounted loosely enough so that it may be rotated within the liner, to open and close the valve, by manipulation of a suitable hand wheel or the like shown at 24.

With the valve closed and the direction of flow through the conduit in the direction shown by the arrow in Fig. 1 and with both the upstream and downstream seals between the liner and valve body in good working order, the upstream pressure forces the O-ring 23 into sealing engagement with the outer extremities of groove 20b, and the adjacent surface of recess 19 to provide a seal. The surface of the liner inside and adjacent the groove 20b is exposed to the upstream pressure. This pressure acting against lip 20c will urge the lip into sealing engagement with the periphery of plug 21. The groove 20b, being in the liner rather than in the valve body, weakens the supporting portion of the liner joining the lip to the main body of the liner whereby the lip is more readily moved in response to this pressure into sealing engagement with the plug. Of course the tapered fit between the plug valve member and the liner is such that the actual movement of the lip is little more than theoretical but the pressure positively holds the lip in sealing engagement with the valve member.

The force acting against the liner and plug, due to the pressure differential across the closed valve, is solidly opposed by a rigid support due to the metal-to-metal contact between the body and liner, and the liner and plug valve member, on the downstream side of the plug valve.

With this arrangement of parts the interior of the valve body is protected from a pressure differential when the valve is closed because the pressure is retained by the upstream O-ring and groove seal. However, even though the pressure should get by the O-ring 23, due to failure of the O-ring, the pressure would be held by the O-ring on the downstream side of the plug valve member and any distortion of the valve body member due to high pressure in such case would not affect the seat liner which, in effect, floats within the recess 19. Thus the seal between the seat liner and plug valve 21 would not be disturbed and the seal between the liner and valve body would be still effective.

In the plug valve of this invention the resilient seal members 23 may be formed of rubber, synthetic rubber or other resilient synthetics, and may be of other suitable configuration instead of circular in cross section, and these members are not expended when the valve is in service as is the case when plastic packing is employed. For this reason the valve requires very little attention during service.

As many possible embodiments may be made of the invention without departing from the scope thereof, it is to be understood that all matter herein described or shown in the accompanying drawings is to be interpreted as illustrative and not in a limiting sense.

The invention having been described, what is claimed is:

1. In a valve having a body with a fluid passageway therethrough, a frusto conical valve seat liner disposed in the passageway and having openings on opposite sides thereof registering with the passageway, a plug type valve member with a passageway therethrough operably mounted within and having a tapered fit with the liner and adapted in one position of the member to close the liner openings and in another position of the member to complete the passage through the liner, said valve seat liner having a close tolerance fit with the body adjacent and surrounding the liner openings, a first groove in the external surface of the liner adjacently surrounding one side opening in said liner, a second groove in the external surface of the liner adjacently surrounding the other side opening in said liner, said grooves each reducing the liner wall thickness to provide a flexible lip immediately adjacent said side openings, and a resilient seal member within each of the grooves and sealing the joints between the liner and body, said seal member being of the type capable of forming a seal between said liner and said body responsive to a pressure applied transversely across the seal member from either direction.

2. In a plug-type valve having a body with a fluid passageway therethrough, a valve seat liner disposed in the passageway and having openings registering with the passageway, a plug valve member with a passageway therethrough operably mounted within the liner and adapted in one position of the plug to close the liner openings and in another position of the plug to complete the passage through the liner, said valve seat liner having a close fit with the body adjacent and surrounding the liner openings, two continuous grooves in the liner opening out onto the surface of said liner facing the body with one groove surrounding one of said openings in said liner and the other groove surrounding the other opening in said liner, said grooves being spaced outwardly from the periphery of said openings whereby lips are provided on the liner surrounding the liner openings adapted to be flexed by an upstream pressure against the valve member when the valve member is in a closed position, and O-ring type seal members formed of flowable resilient material one within each of the grooves, said seal members sealing the joints between the liner and body irrespective of the direction of pressure application thereto.

3. As a subcombination, a removable seat liner adaptable for use with plug valves comprising a member having a portion semi-circular in transverse cross-section providing an internal seat surface for a plug valve member and an external seat surface for seating in a valve body, an opening in the member surrounded by the seat surface, and a packing receiving groove in the member on the side opposite from the internal seat surface and surrounding the opening whereby there is provided portions of said external surface immediately on each side of said groove adapted to closely fit with a valve body, said groove reducing the liner wall thickness to provide a flexible lip immediately adjacent the opening.

HERBERT ALLEN.

REFERENCES CITED

The following references are of record in the file of this patent:

UNITED STATES PATENTS

| Number | Name | Date |
| --- | --- | --- |
| 1,584,699 | Davenport | May 11, 1926 |
| 2,349,978 | Miller | May 30, 1944 |
| 2,414,966 | Melichar | Jan. 28, 1947 |
| 2,433,732 | Brown | Dec. 30, 1947 |
| 2,461,041 | Donaldson | Feb. 8, 1949 |
| 2,520,288 | Shand et al. | Aug. 29, 1950 |

FOREIGN PATENTS

| Number | Country | Date |
| --- | --- | --- |
| 6,222 | Great Britain | of 1882 |
| 490,746 | France | of 1919 |